United States Patent [19]
Lemons

[11] Patent Number: 5,485,319
[45] Date of Patent: Jan. 16, 1996

[54] MEDICAL DEVICE FOR LIGHTING A TREATMENT FIELD

[75] Inventor: Thomas M. Lemons, Marblehead, Mass.

[73] Assignee: Alm S.A., Romainville, France

[21] Appl. No.: 212,141

[22] Filed: Mar. 17, 1993

Related U.S. Application Data

[63] Continuation of Ser. No. 720,962, Jun. 25, 1991, abandoned.

[51] Int. Cl.[6] .................... G02B 5/04; G02B 17/08; F21V 5/00; A61G 13/00
[52] U.S. Cl. .................... 359/833; 359/837; 359/710; 359/727; 362/309; 362/323; 362/337; 362/339
[58] Field of Search ...................... 359/833, 837, 359/710, 727, 503; 362/309, 339, 340, 323, 322, 337

[56] References Cited

U.S. PATENT DOCUMENTS

| | | | |
|---|---|---|---|
| 1,559,838 | 11/1925 | Anthony | 362/279 |
| 2,982,179 | 5/1961 | Lace | 362/324 |
| 3,839,632 | 11/1974 | Federico | 362/278 |
| 3,941,993 | 10/1974 | Hubert | 362/309 |
| 4,159,511 | 6/1979 | Dejonc | 362/804 |
| 4,207,607 | 6/1980 | Gulliksen | 362/282 |
| 4,222,094 | 9/1980 | Wolar | 362/325 |
| 4,316,237 | 2/1982 | Yamada | 362/33 |
| 4,337,759 | 7/1982 | Popovich et al. | 126/438 |
| 4,400,765 | 8/1983 | Kochen | 362/277 |
| 4,428,031 | 1/1984 | Mori | 362/32 |
| 4,519,021 | 7/1984 | Oram | 362/277 |
| 4,581,689 | 4/1986 | Oram | 362/275 |
| 4,617,619 | 10/1986 | Gehly | 362/804 |
| 4,651,257 | 3/1987 | Gehly | 362/33 |
| 4,729,070 | 3/1988 | Chiu | 362/33 |
| 4,803,607 | 2/1989 | Jönsson | 362/250 |
| 4,855,884 | 8/1989 | Richardson | 362/278 |
| 4,937,715 | 6/1990 | O'Shea et al. | 362/268 |
| 5,001,516 | 3/1991 | Gehly et al. | 362/308 |
| 5,067,064 | 11/1991 | Gehly et al. | 362/277 |

*Primary Examiner*—Ricky D. Shafer
*Attorney, Agent, or Firm*—Pennie & Edmonds

[57] ABSTRACT

A device for lighting a medical treatment field is disclosed and includes an optical member for focusing a plurality of light rays. The device also includes a prism assembly formed of a plurality of sectors of prisms. Each prism has an entry face and an exit face. The vertices of the sectors are substantially located in the center of the prism assembly. The sectors of prisms are configured and dimensioned so that the optical focusing member can focus the plurality of light rays generally onto the entry faces of the prisms. In addition, the device includes a mechanism for displacing at least a predetermined number of sectors such that the exit faces of the prisms of the predetermined sectors can be selectively positioned in one of a generally planar or a non-planar configuration. In an alternative embodiment, the device includes an optical focusing member and a prism assembly wherein the exit faces of the prisms are generally arc shaped along the length of the sector. The prisms can be either curved or straight.

29 Claims, 13 Drawing Sheets

5,485,319

MEDICAL DEVICE FOR LIGHTING A TREATMENT FIELD

This is a continuation of application Ser. No. 07/720,962, filed Jun. 25, 1991 now abandoned.

The present invention relates to a medical device for lighting or illuminating a treatment field. In particular, the present invention relates to a surgical prismatic light for illuminating a surgical field.

BACKGROUND ART

The use of illuminating devices is well-known in the medical industry to provide personnel with adequate lighting during medical procedures such as examinations and surgery. Typically, illuminating devices are attached to a ceiling or wall mount or alternatively to a floor stand and are adapted to be placed into a desired position to satisfy the lighting needs of medical personnel. An illuminating device employing prisms to concentrate light onto an operating area or field is described in U.S. Pat. No. 3,941,993 which is incorporated herein in its entirety by reference. Commercial embodiments of such a prismatic light which has a cupola mounted, for example, on a ceiling suspension is available from ALM EQUIPEMENTS Hospitaliers of France, having a distributor, ALM Surgical Equipment Inc. of Santa Ana, Calif., as illustrated and described in a technical manual entitled "Operating Theatre Light ECL 701" (1983) which is also incorporated herein in its entirety by reference.

Generally, the device of the '993 patent includes in a preferred embodiment a prism assembly formed of a plurality of prisms 13 which are positioned generally as shown in FIG. 3 thereof with respect to one or more light sources 14, 15 or 16. The light emitted by the source or sources is directed by a corresponding number of toroidal optical systems 17, 18 and 19 onto the prisms 13. Preferably the individual prisms are straight and grouped into sectors as shown in FIG. 4 of the '993 patent. In addition, the prisms are oriented so that light from the source(s) is directed by the toroidal optical system(s) perpendicularly onto the faces of the prisms, is totally reflected by the opposite face and then is refracted by the exit face. The apex angles of the prisms allows for directing the light rays onto the desired portions of the field 21 as shown in FIG. 5 on the '993 patent. In this manner, the device of the '993 patent illuminates the operating field of a patient lying on an operating table with substantially uniform illumination, excellent shadow control and good depth of field.

Another prismatic surgical light employing curved prisms is set forth in French Patent 1,495,007 which is also incorporated herein in its entirety. This French patent is generally described in column 1 of the '993 patent and illustrated schematically in FIG. 1 thereof. Unlike the device of the '993 patent, the device of the aforementioned French patent did not generally provide for uniform illumination as illustrated in FIG. 2 of the '993 patent. The curved prim of the French Patent '007 was a completely circular lens that was not broken into sectors as proposed by the '993 patent.

Despite the advantages of the device according to the '993 patent, there remains a continuing need to improve the convenience and performance of the lighting device for medical use. I have invented an improved medical illuminating device which provides additional improvements to presently available medical prismatic lights. These improvements address the needs of various medical personnel in circumstances where various illumination patterns may be desired. For example, the present invention provides that once the light is positioned within a wide range of positions, then tilting of the exit faces of the prisms allows for variation of the intensity of illumination or for change of the area of illumination. In addition, such tilting capability with a prismatic lighting system allows for relocation of the optimization of the depth of field while still allowing for generally uniform illumination. Also, the present invention provides for lower or greater intensity throughout the region of illumination.

SUMMARY OF THE INVENTION

The present invention is directed to a device for lighting a treatment field comprising means for focusing a plurality of light rays; prism assembly formed of a plurality of sectors of prisms, each prism having an entry face and an exit face, the vertices of the sectors being substantially located in the center of the prism assembly, the sectors of prisms being configured and dimensioned so that the focusing means can focus the plurality of light rays generally onto the entry faces of the prisms; and means for displacing at least a predetermined number of sectors such that the exit faces of the prisms of the predetermined sectors can be selectively disposed in a configuration being one of a generally planar and a non-planar configuration.

In a preferred embodiment, the displacing means comprises an annular member configured and dimensioned so as to support the inner ends of the predetermined sectors and being selectively moveable along a predetermined direction such that movement of the annular member disposes the predetermined prism exit faces in a configuration being one of a generally planar and a non-planar configuration. The annular member is selectively movable from a first position to a second position such that the prism assembly will focus light at a range of planes respectively between a first plane and a second plane. A relatively small intense light spot is produced at one plane while a relatively large reduced intensity area of light is produced at other planes at least above and below the plane of the small light spot. Preferably, the displacement from the first position to the second position provides an angular deviation of the beam of light rays exiting from the exit faces of the prisms of about six degrees.

The lighting device according to the present invention is selectively movable along the predetermined direction from a first position whereby the prism exit faces are generally non-planar through a position whereby the prism exit faces are generally planar and to a second position whereby the prism exit faces are generally non-planar. The first position to the second position preferably provides an angular deviation of the beam of light rays exiting from the exit faces of the prisms from about minus three degrees to plus three degrees as determined from the position whereby the prism exit faces are generally planar.

The lighting device in a preferred embodiment has an annular member with an L shaped member disposed along its periphery and extending outwardly therefrom so as to receive the inner ends of the predetermined sectors. The displacing means comprises at least one rod member disposed generally along the predetermined direction. The annular member is configured and dimensioned so as to be slectively slidably moveable along at least a portion of the at least one rod member.

In one preferred embodiment, the displacing means further comprises plate member having at least one raised surface of a predetermined slope, the plate member being rotatably disposed adjacent the annular member; and at least one pin member coupled at one end to the annular member and at its other end being in contact with the raised surface such that upon rotation of the plate member, the pin member at its other end will move along the raised surface and correspondingly displace the annular member together with the inner ends of the prisms along the rod member. Preferably, a plurality of pin members are coupled at their one ends to the annular member, and the plate member having a corresponding plurality of raised surfaces so that each other end of the pin members is in contact with a respective raised surface on the plate member. The plurality of pin members are spaced relative to the annular member and the raised surfaces are correspondingly spaced about the plate member.

A tab extends from a portion of the periphery of the plate member whereupon selective movement of the tab will rotate the plate member and thereby displace the inner ends of the prisms along the rod member.

In alternative preferred embodiments, the means for focusing a plurality of light rays comprises at least one generally toroidal optical system or at least one generally reflective optical system. Both optical systems have an optical axis which generally intersects the center of the prism assembly. Also, in each system, at least one light source is provided and is dimensioned and configured so that at least a portion of light rays emitted from the light source fall onto or are collected by the optical system and are focused onto the entry faces of the prisms.

In an alternative preferred embodiment, each prism has a reflective face for receiving light directed thereto after passing through the entry face and for directing light through the exit face of the prism.

The present invention is also directed to an optical apparatus for a device for lighting a treatment field comprising prism assembly formed of a plurality of sectors of prisms, each prism having an entry face and an exit face, the vertices of the sectors being substantially located in the center of the prism assembly, the sectors of prisms being configured and dimensioned so that a plurality of light rays falling generally onto the entry faces of the prisms is directed onto the treatment field; and means for displacing at least a predetermined number of sectors such that the exit faces of the prisms of the predetermined sectors can be selectively positioned in a configuration being one of a generally planar and a non-planar configuration.

In a preferred embodiment, each prism has a reflective face for receiving light directed thereto after passing through the entry face and for directing light through the exit face of the prism.

The optical apparatus comprises means for focusing a plurality of light rays so as to fall generally onto the entry faces of the prisms. Alternatively, the focusing means can be a toroidal or reflective optical system.

In addition, the present invention is directed to an optical apparatus for a device for lighting a treatment field comprising prism assembly formed of a plurality of sectors of prisms, each prism having an entry face and an exit face, the vertices of the sectors being substantially located in the center of the prism assembly, the sectors of prisms being configured and dimensioned so that a plurality of light rays falling generally onto the entry faces of the prisms is directed onto the treatment field; and the exit faces of the prisms being generally arc shaped along the length of the sector. Preferably, the prism assembly comprises a plurality of sector members, each sector member having one surface on which the prisms are disposed and the other surface being the exit face of the prisms and being generally arc shaped along the length of the sector member. The prisms, according to preferred alternative embodiments, can be curved or straight.

In an alternative embodiment, the prism assembly comprises a plurality of sector members, each sector member having one surface on which the prisms are disposed and through which light rays enter and an outer surface through which the light rays exit; and a plurality of wedge members corresponding in number to the plurality of sector members, each wedge member having an inner surface through which the exiting light rays enter and corresponding in configuration to that of the outer surface of the respective sector member and having an outer surface being the exit face of the prisms and being generally arc shaped along the length of the respective sector member, the inner surface of the wedge member being disposed parallel and adjacent to the other surface of the respective sector member. The inner surface of the wedge member and the other surface of the respective sector member can be generally contiguous.

Also, each prism can have a reflective face for receiving light directed thereto after passing through the entry face and for directing light through the exit face of the prism.

The optical apparatus further comprises means for focusing a plurality of light rays generally onto the entry faces of the prisms and also means for displacing at least a predetermined number of sectors such that the exit faces the prisms of the predetermined sectors can be selectively disposed in a configuration being one of a generally planar and a non-planar configuration.

Furthermore, the present invention is directed to a method for lighting a treatment field comprising a positioning a lighting device adjacent and at a desired height above the treatment field. The lighting device comprises light source; means for focusing a plurality of light rays from the light source; prism assembly formed of a plurality of sectors of prisms, each prism having an entry face and an exit face, the vertices of the sectors being substantially located in the center of the prism assembly, the sectors of prisms being configured and dimensioned so that the focusing means can focus the plurality of light rays generally onto the entry faces of the prisms; and means for displacing at least a predetermined number of sectors such that the exit faces of the prisms of the predetermined sectors can be selectively disposed in a configuration being one of a generally planar and a non-planar configuration. The method further comprises turning on the light source; and selectively operating the displacing means so as to selectively dispose the exit faces of the prisms in one of a generally planar and a non-planar configuration so as to produce a predetermined light spot size at a desired plane with a corresponding relatively reduced intensity area of light at planes at least above and below the plane of the small light spot.

BRIEF DESCRIPTION OF THE DRAWINGS

The present invention is described in detail below with reference to the drawings in which.

1 and including an arc shaped wedge coupled to the sector member having a generally flat bottom surface.

Figure 1:
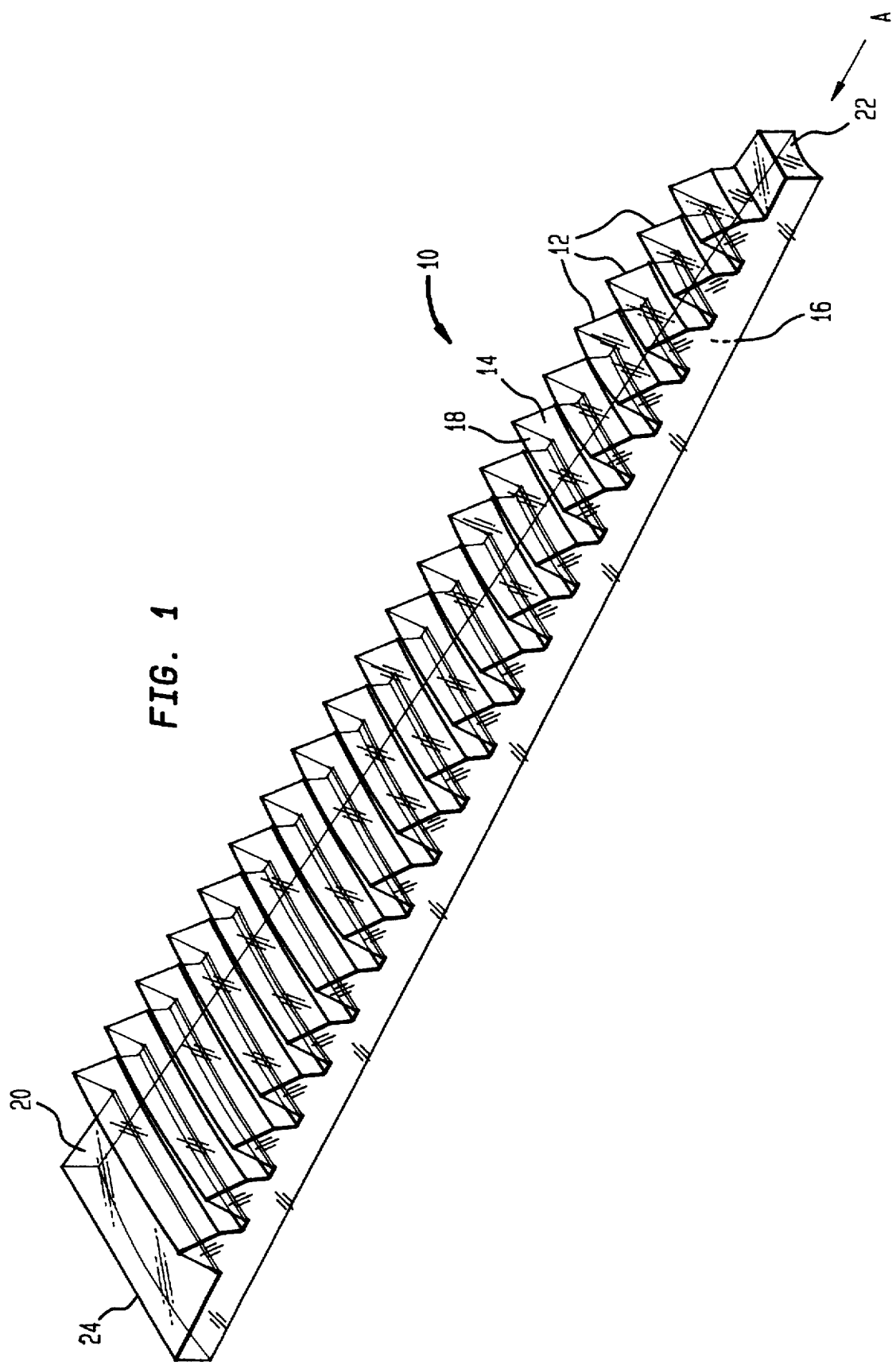
FIG. 1 is a perspective view of a sector of curved prisms having an arc shaped exit face on a sector member according to the present invention.
Figure 4:
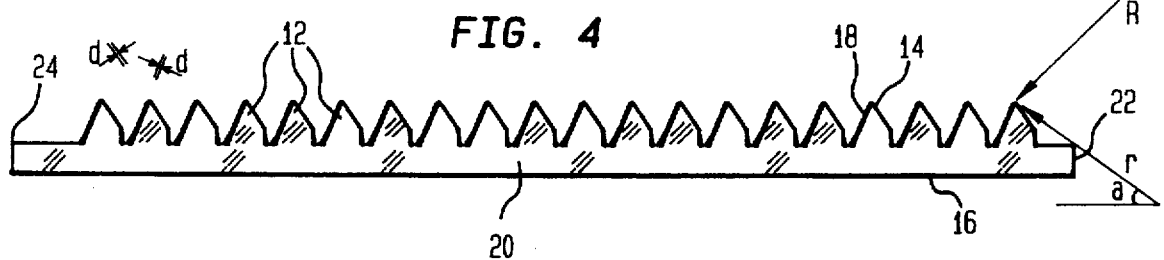

FIG. 4 is a side view of the sector of prisms of FIG. 1.

Figure 5:

FIG. 5 is a top view of the sector of prisms of FIG. 1.

Figure 3:
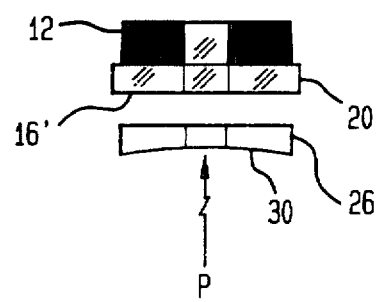
FIG. 3 is an inner end view of an alternative embodiment of the sector of prisms of FIG. 1 taken along line A of FIG.
Figure 6:
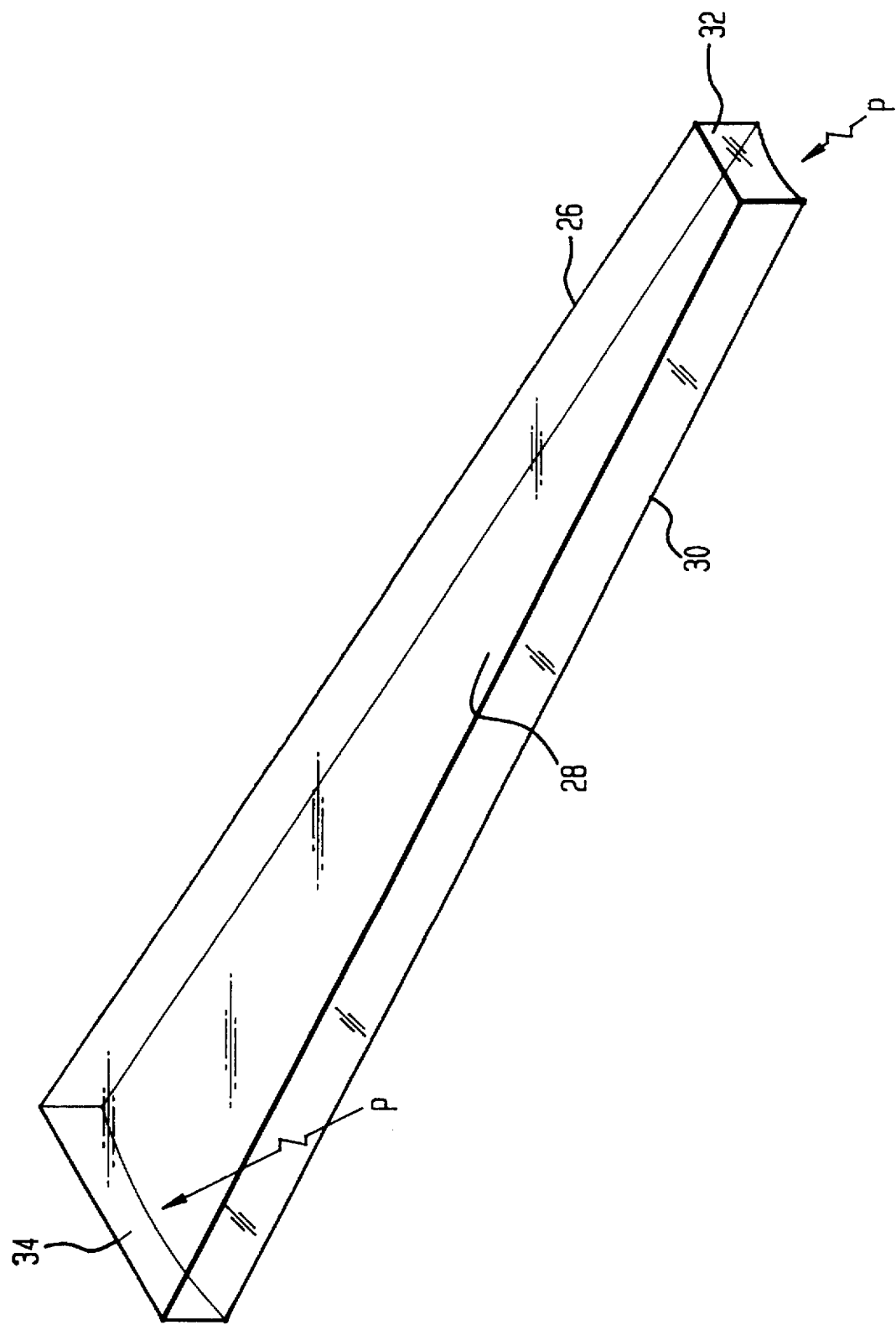

FIG. 6 is a perspective view of the arc shaped wedge member of FIG. 3 according to the present invention.

Figure 7:
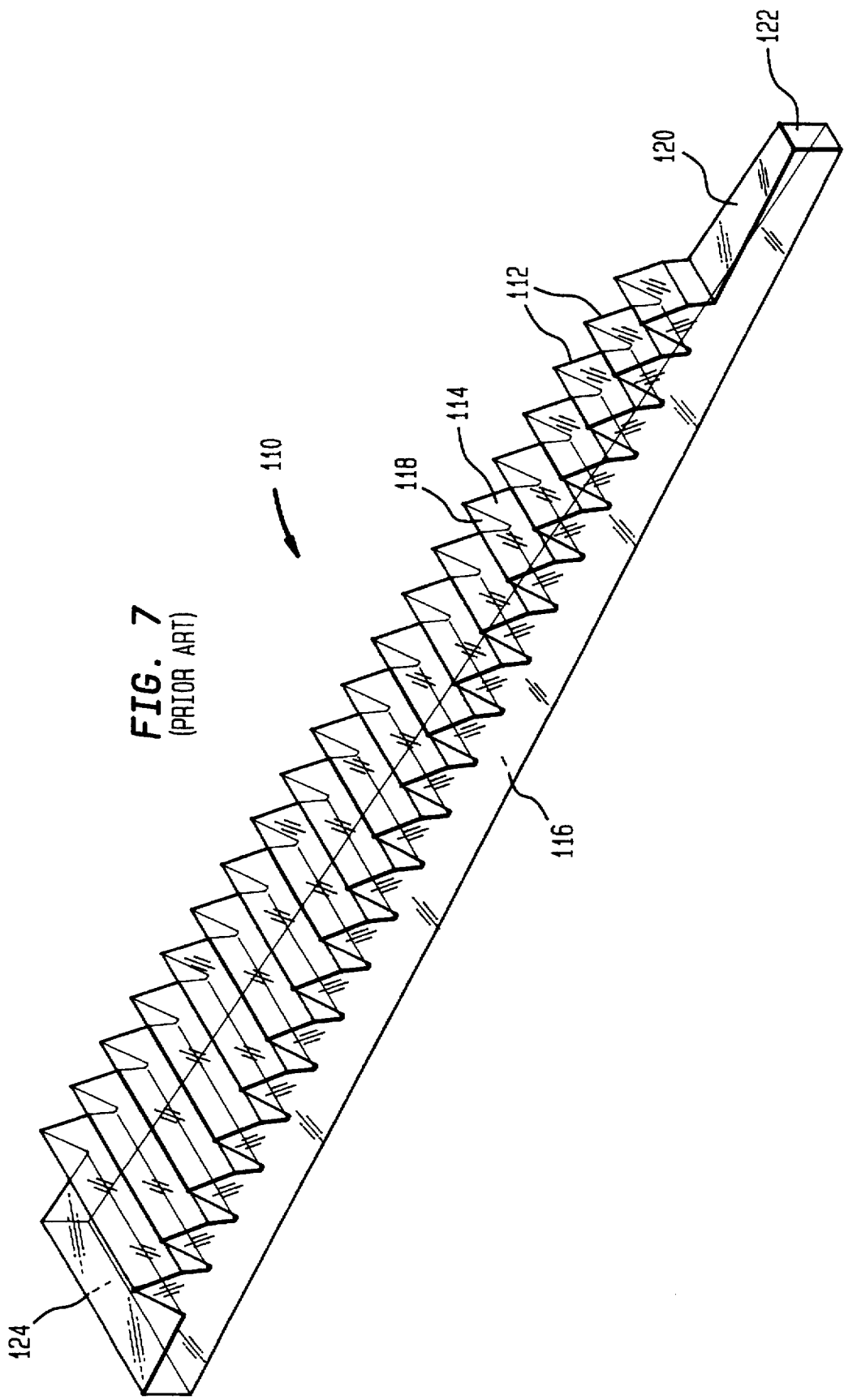

FIG. 7 is a perspective view of a sector of straight prisms with a flat exit face.

Figure 8:
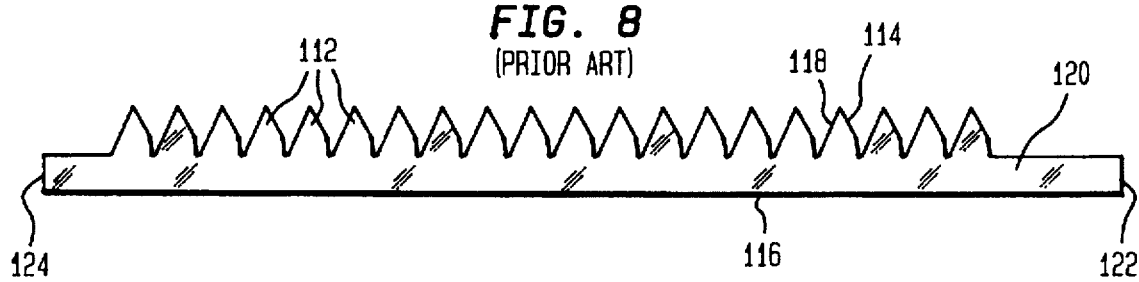

FIG. 8 is a side view of the sector of FIG. 7.

Figure 9:
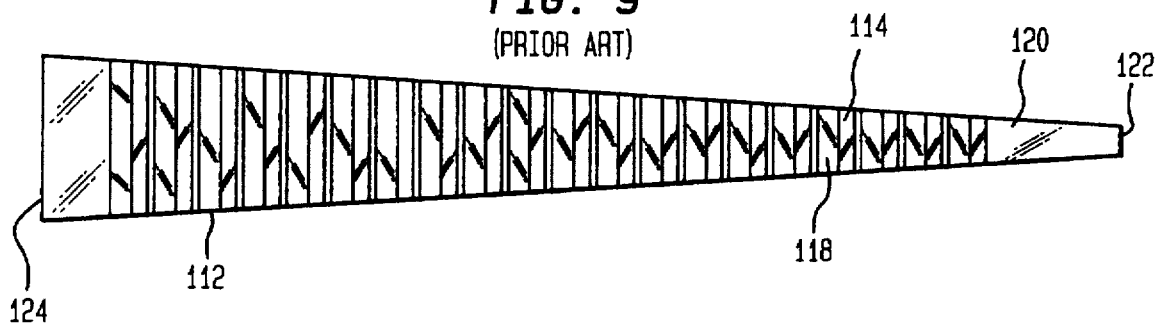

FIG. 9 is a top view of the sector of FIG. 7.

Figure 10:
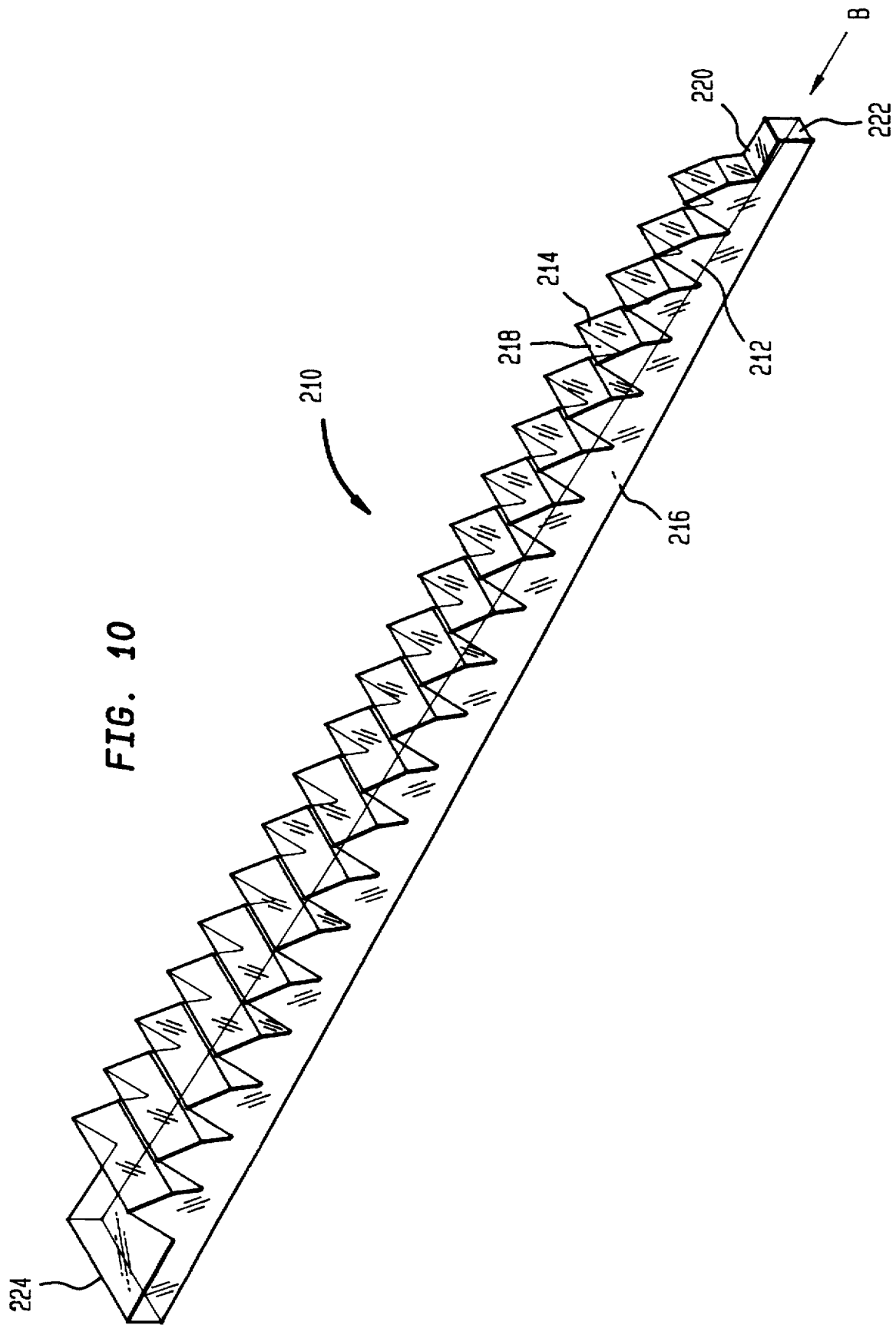

FIG. 10 is a perspective view of a half sector of prisms according to the present invention.

Figure 11:
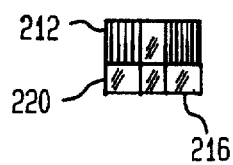

FIG. 11 is an inner end view of the half sector of prisms of FIG. 10 having flat exit faces taken along line B of FIG. 10.

Figure 12:
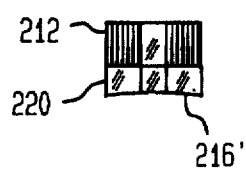

FIG. 12 is an inner end view of the half sector of prisms of FIG. 10 having arc shaped exit faces taken along lines B of FIG. 10.

Figure 13:
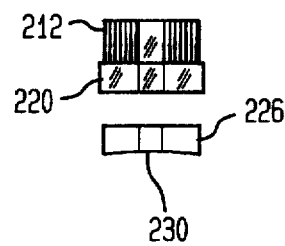

FIG. 13 is an inner end view of the half sector of prisms of FIG. 11 and including an arc shaped wedge positioned below the flat bottom surface of the half sector.

Figure 14:
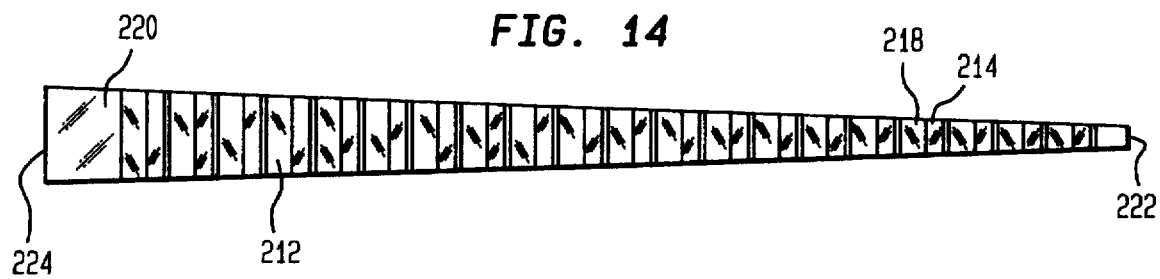

FIG. 14 is a top view of the half sector of FIG. 10.

Figure 15:
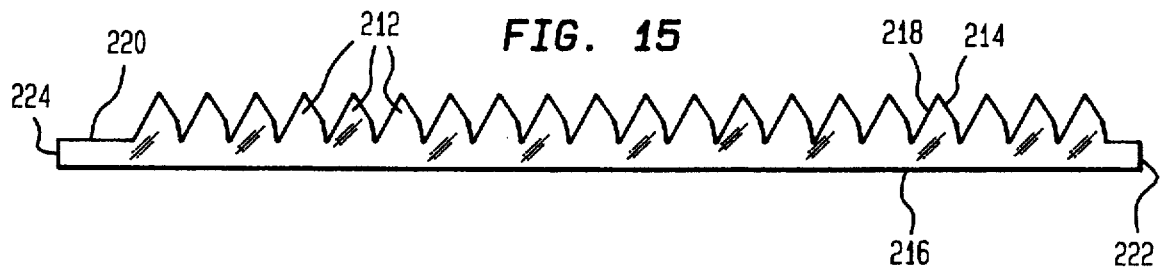

FIG. 15 is a side view of the half sector of FIG. 10.

Figure 16:
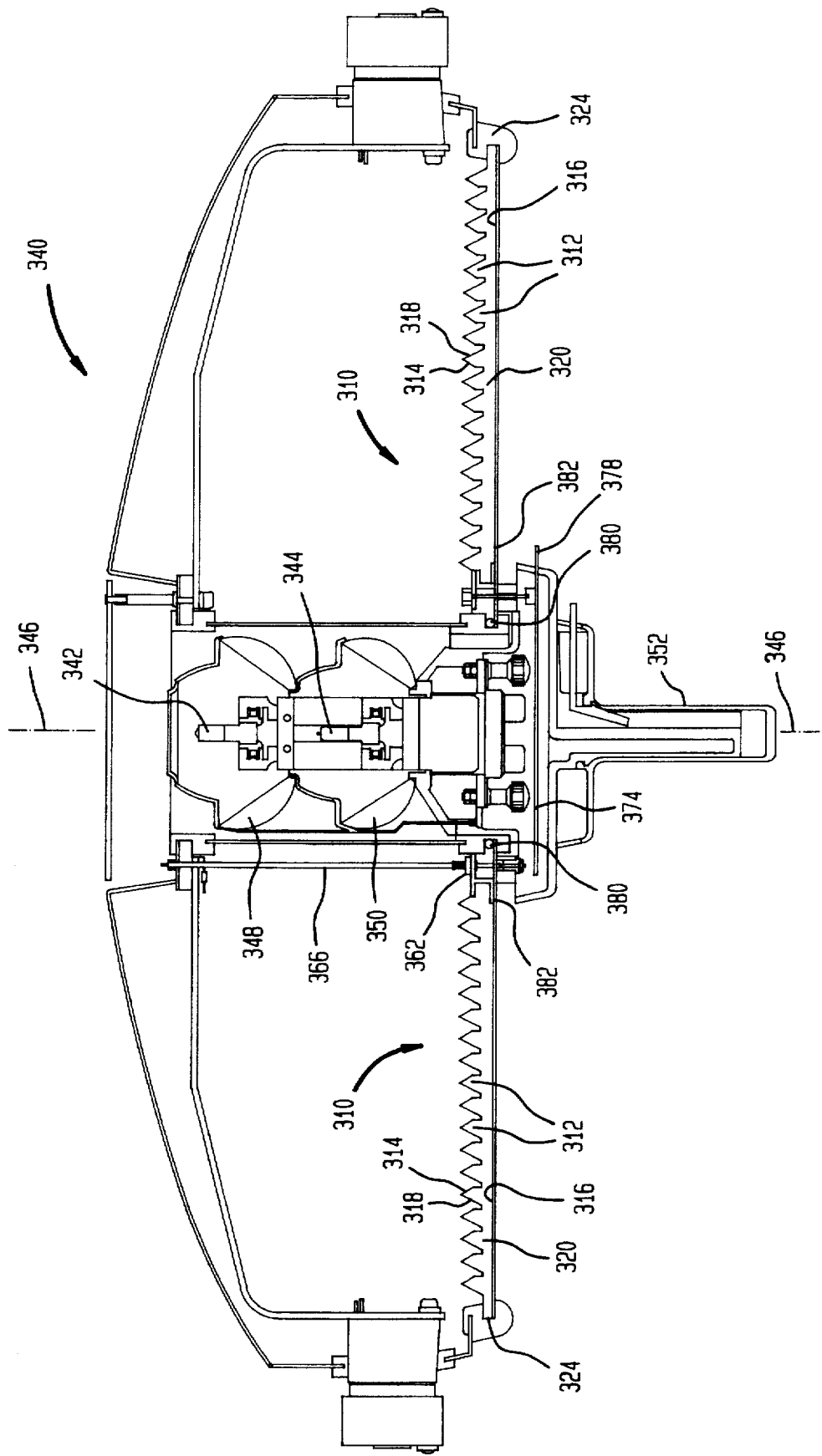

FIG. 16 is a side elevational cross-sectional view of a prismatic surgical light according to the present invention.

Figure 17:
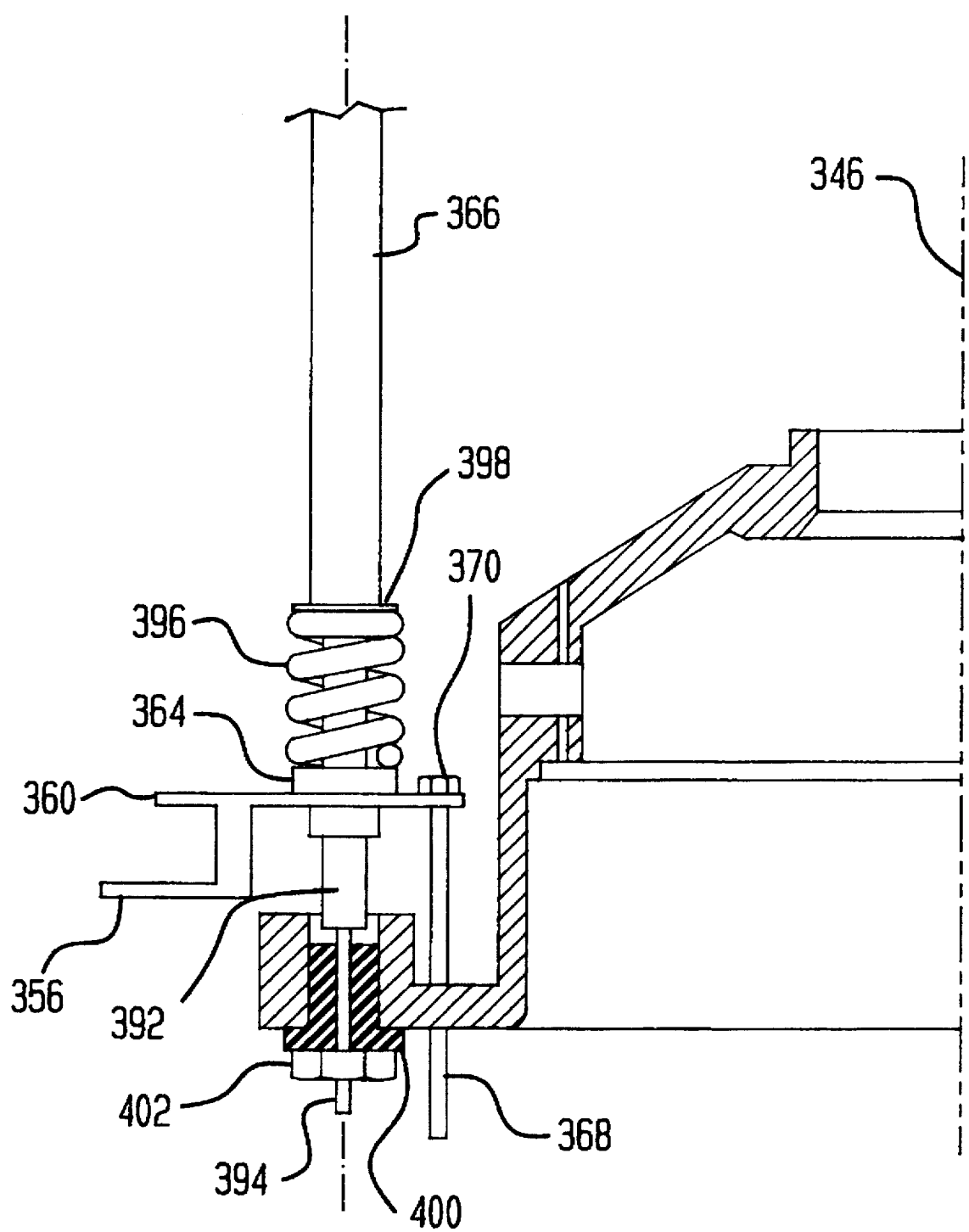

FIG. 17 is an enlarged view of the coupling of the prism adjustment bracket to the spacer rod.

Figure 18:
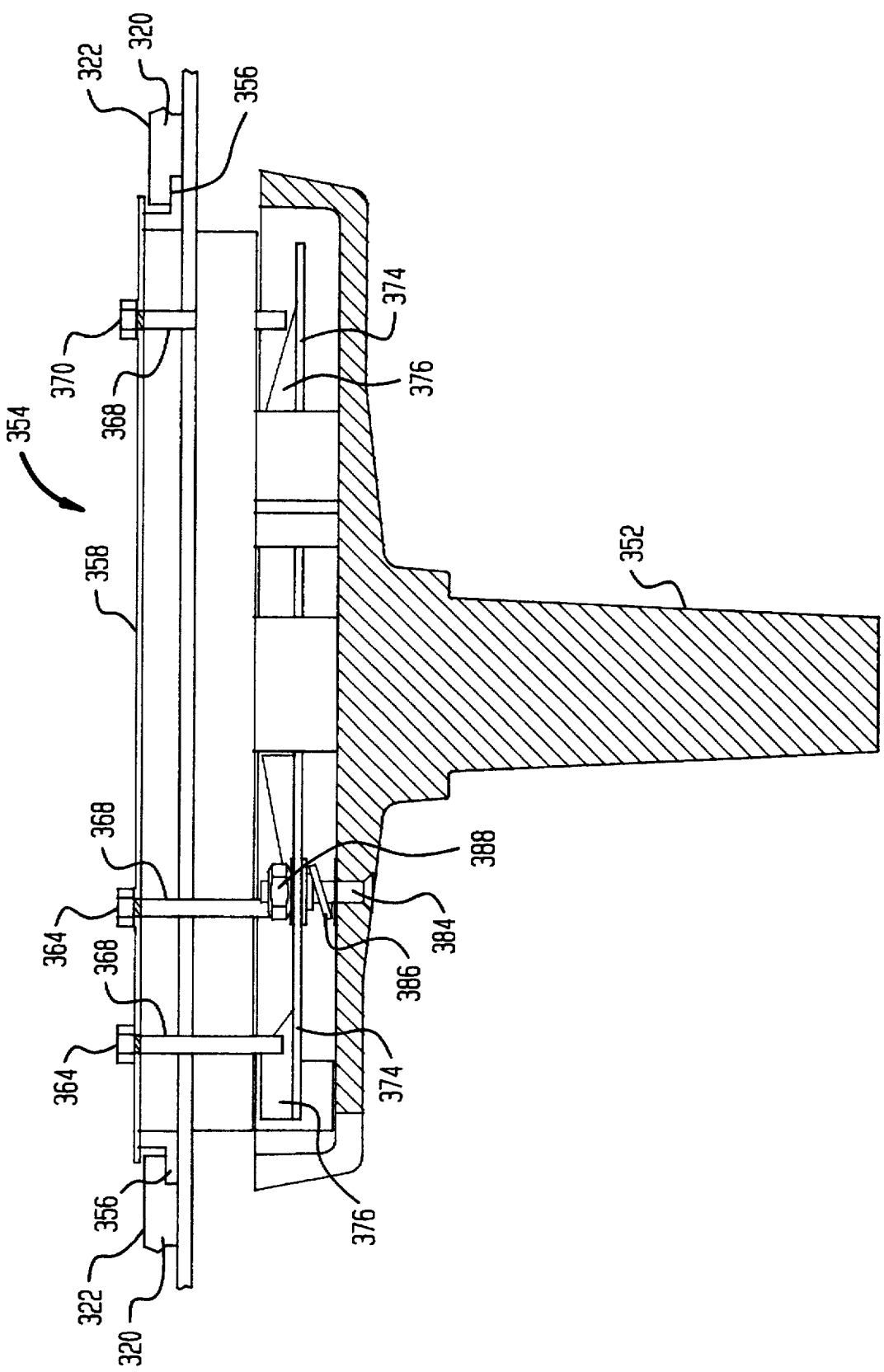

FIG. 18 is an enlarged view of the handle and displacement mechanism of FIG. 16.

Figure 19:
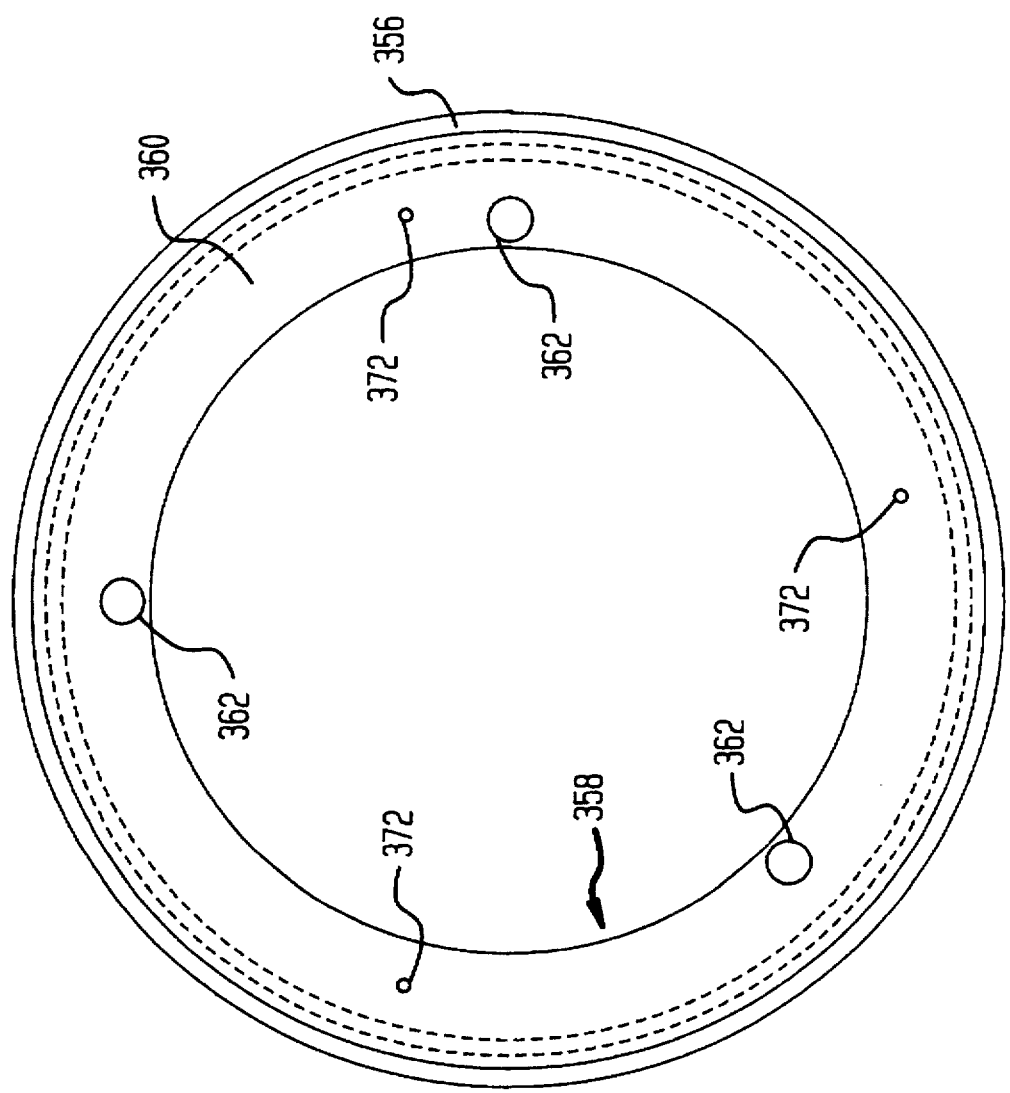

FIG. 19 is a top view of the prism adjustment bracket which retains the inner end portions of the prism assembly.

Figure 20:
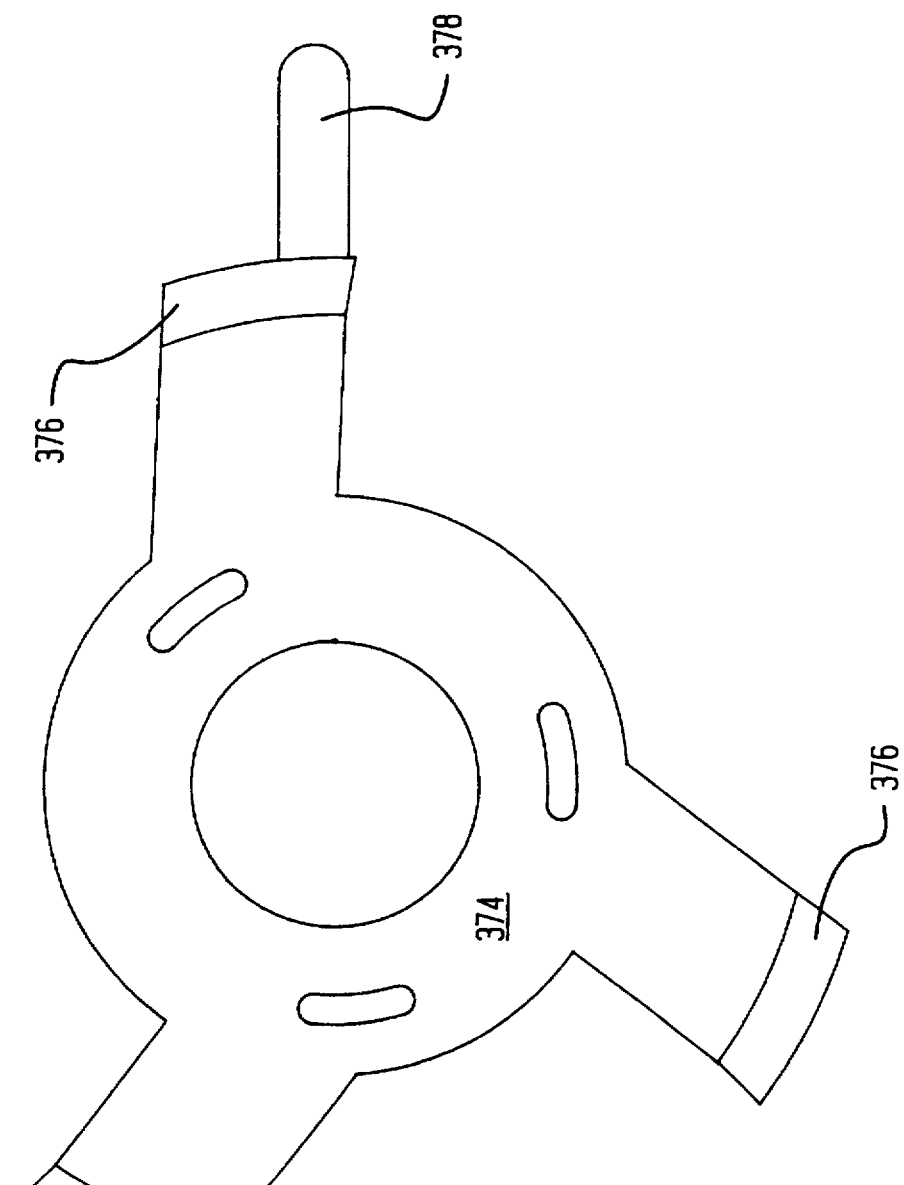

FIG. 20 is a top view of the prism adjustment plate.

Figure 21:
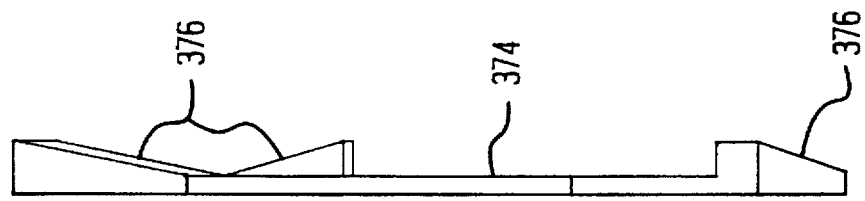

FIG. 21 is a side view of the prism adjustment plate of FIG. 19.

Figure 22:
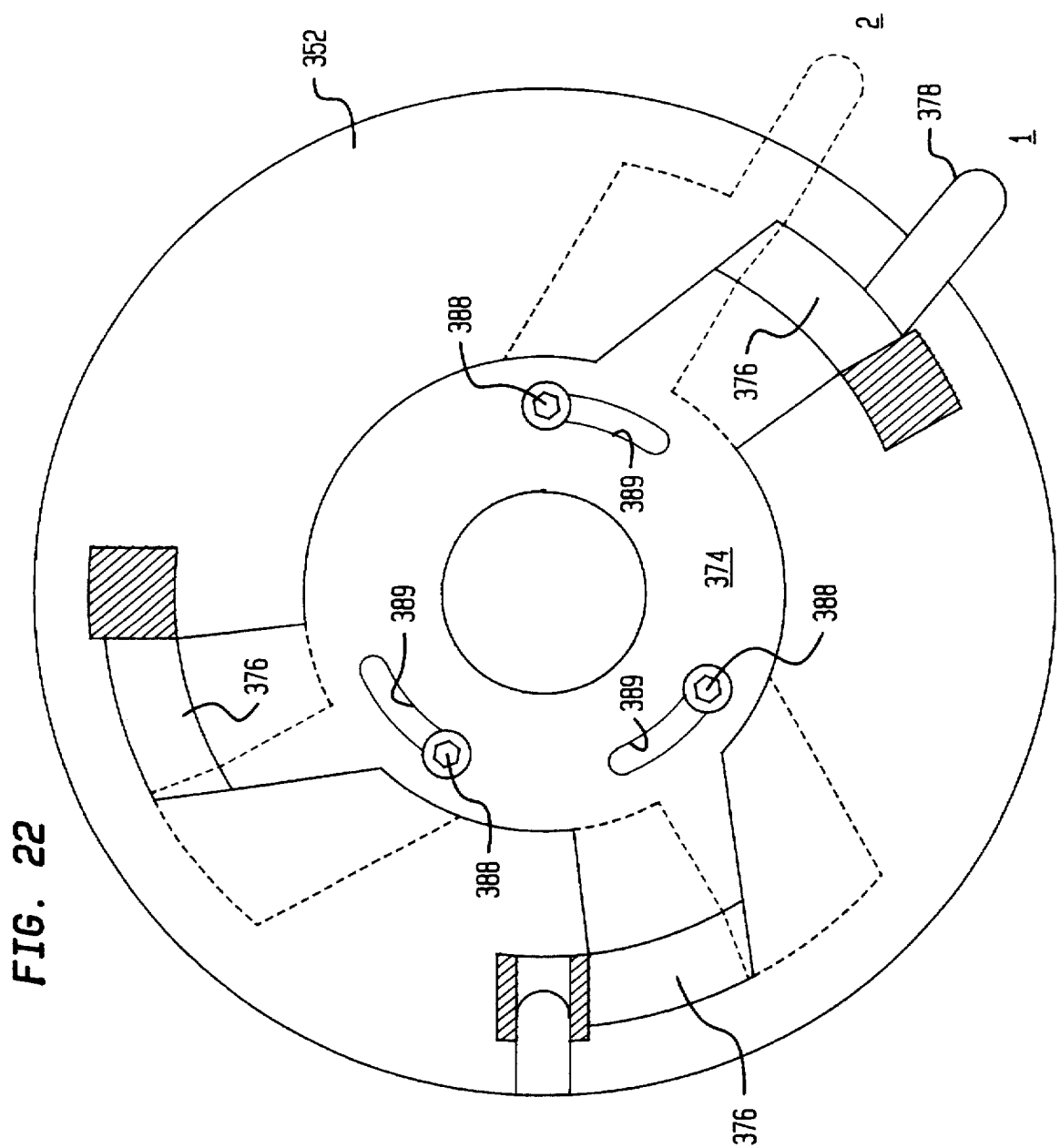

FIG. 22 is a top view of the prism adjustment plate in operation between two positions.

DETAILED DESCRIPTION OF THE PREFERRED EMBODIMENTS

In the description which follows, any reference to either direction or orientation is intended primarily and solely for purposes of illustration and is not intended in any way as a limitation to the scope of the present invention. Also, the particular embodiments described herein, although being preferred, are not to be considered as limiting of the present invention. Furthermore, like parts or elements in the various drawings hereto are identified by like numerals for ease of reference.

As shown in FIG. 1, a prismatic assembly 10 for use in an illuminating device includes a plurality of prisms 12. Each prism 12 has at least an entry face 14 and an exit face 16. In addition, and if desired, the prism 12 can include a reflective face 18. For convenience of construction and assembly, the plurality of prisms 12 are formed preferably integrally with a generally triangularly shaped sector member 20 which has an inner end portion 22 and an outer end portion 24 which are free of prisms to allow for coupling the sector member in the illuminating device as described in more detail below. The bottom surface of sector member 20 provides the exit face 16 of the prisms 12. As shown, the prisms 12 are curved but can be of various shapes or configurations. Moreover, the prisms 12 can be of various sizes on the sector member 20. For example, instead of a plurality of individual prisms 12, one behind the other, there can be several prisms 12 aside each other on the sector member 20 at any given position from the inner end portion 22.

Figure 2:
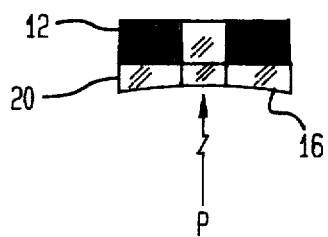
FIG. 2 is an inner end view of the sector of prisms of FIG. 1 taken along line A of FIG. 1.

As shown in FIGS. 2 and 4, the prisms 12 are preferably of the same height above the upper surface of sector member 20. Also, the prisms 12 are smaller in length in the direction of the inner end portion 22 as illustrated in FIG. 5. However, as noted, various configurations including different heights are available. As viewed from on top in FIG. 5, the sector member 20 is triangular in shape. In this manner, a plurality of sector members 20 can be positioned one aside the other with an optical axis perpendicular to arrow A of FIG. 1. Thus, the respective inner end portions 22 will be adjacent the optical axis.

Referring to FIG. 2, the exit face 16 of prism sector 20 preferably is curved in a generally arc shaped configuration. The arc shaped surface 16 preferably has a radius of curvature of about 3.5 inches from a curvature center "P" positioned below surface 16 as shown in FIG. 2. This radius of curvature provides a lateral beam spread of about 2 degrees for a prism sector having a width at the outer end portion 24 of about 1⅛ inches.

In the alternative embodiment shown in FIG. 3, the lower surface 16' of sector member 20 is generally flat and a wedge member 26 is provided for mating with the lower surface 16'. As shown more clearly in FIG. 6, the wedge member 26 has an upper surface 28 which will conform to the surface configuration of the lower surface 16' of sector member 20. This will allow for the passage of light rays through the sector member 20 and into the wedge member 26 with no interruption as to the direction of travel. Upon passing through wedge member 26, the light rays pass out the lower surface 30 which serves as the exit faces of the prisms 12 on sector member 20. However, in this alternative embodiment, the lower surface 30 has a arc shaped configuration as previously provided in surface 18 of the embodiment illustrated in FIG. 2. For purposes of illustration, the curvatures of the arc shaped surfaces in the FIGS. herein may be exaggerated in order to more clearly indicate the curvature thereof. The wedge member 26 can be as long and as wide as the corresponding sector member 20. However, it can be shorter in length than the sector member 20 so long as it is sufficiently long to extend beneath the prisms 12 and thus provide their exit faces 30.

Preferably in the embodiment illustrated in FIGS. 1-6 which includes twenty prisms 12, the radius of curvature of the arc of the arc shaped configuration preferably has a radius of curvature of about 3½ inches from a curvature center "P" which would be positioned below surfaces 16 or 30. However, the height of the arc of the arc shaped surfaces 16 or 30 will increase from the inner end portion 32 to the outer end portion 34 of wedge member 26. At the inner end portion 32, the difference in the height of the arc at the center versus the edges is about 0.002 inches and at the outer end portion 34 the height difference is about 0.028 inches. For the curved prism faces 14 and 18 this difference between the center and the edges is called the sag and is represented in FIG. 4 by "d". In the case of the preferred embodiment of FIG. 2, wherein the arc shaped surface is provided in the exit face surface 16 of sector member 20, the same numerical quantities for the heights apply as well.

As shown in FIG. 4, the curvature of the entry face 14 is defined by radius of curvature "R" while the radius of curvature of the reflective face 18 is defined by the radius of curvature "r". Moreover, the angle "a" by which the radius of curvature "r: extends above a horizontal is set forth in the table below together with the values for "r" and "R". However, the value of the angle "b" by which the radius of curvature "R" extends below the horizontal is preferably the same for each prism and is about −30° as established by the toroidal optical system discussed below. As noted, the table below provides the list of values for each prism where the first (1) prism is adjacent the inner end portion 22 and the twentieth (20) prism is positioned adjacent the outer end portion 24. The intermediate prisms are numbered sequentially therebetween. In addition, also shown in the Table is the value of "d" which represents the sag or eyes of the curvature surfaces for the entrance face and reflective face 16.

| Prism | R | r | a | d |
|---|---|---|---|---|
| 1 | 4.546 | 4.447 | 27.7° | 0.005 |
| 2 | 5.069 | 4.958 | 27.7° | 0.0055 |
| 3 | 5.592 | 5.440 | 27.1° | 0.006 |
| 4 | 6.114 | 5.975 | 27.6° | 0.007 |
| 5 | 6.637 | 7.023 | 27.8° | 0.008 |
| 6 | 7.160 | 7.023 | 28.0° | 0.009 |
| 7 | 7.683 | 7.481 | 27.2° | 0.0095 |
| 8 | 8.206 | 7.968 | 26.9° | 0.0105 |
| 9 | 8.728 | 8.982 | 25.6° | 0.011 |
| 10 | 9.251 | 8.406 | 25.9° | 0.012 |
| 11 | 9.774 | 7.386 | 25.6° | 0.013 |
| 12 | 10.297 | 9.905 | 25.8° | 0.014 |
| 13 | 10.820 | 10.339 | 25.0° | 0.0145 |
| 14 | 11.342 | 10.856 | 25.2° | 0.015 |
| 15 | 11.865 | 11.375 | 25.4° | 0.016 |
| 16 | 12.388 | 11.896 | 25.6° | 0.017 |
| 17 | 12.911 | 12.327 | 24.9° | 0.018 |
| 18 | 13.434 | 12.647 | 25.1° | 0.019 |
| 19 | 13.956 | 13.314 | 24.8° | 0.0195 |
| 20 | 14.479 | 13.247 | 25.1° | 0.020 |

The curvature centers for the curved prisms 12 of FIG. 4 need not necessarily coincide. Unlike in the operation of the French patent which provided for a central peak area of light intensity, the curved prisms 12 of FIGS. 1–5 coupled with the arc shaped surface 16 or 30 provide a more uniform illumination in a smaller area of illumination than that obtained with like sized straight prisms. The embodiments of FIGS. 1–5 are employed preferably in 700 model prismatic lights prisms available from ALM such as that described and illustrated in the aforementioned technical manual.

Although the preferred embodiment of FIG. 1 has 20 prisms 12, the number can vary as desired. Preferably there are 20 prisms which is the number available in the 700 model lights sold by ALM. In the 500 model there are 10 and in the 900 model there are 31. Moreover, the individual prisms 12 can be integrally formed with the sector member 20 during construction or formed separately and optically coupled to the sector member 20. Also, as noted, the size of the prisms can vary as well as the positioning of the prisms 12 themselves on the sector member 20. In either event, the exit surfaces 16 of the sector member 20 or exit surface 30 of wedge member 26 will provide the exit faces of the prisms 12. In operation, the light can be passed through the entry face 14 and refracted through the prisms 12 out through the exit surface 16 of sector member 20 in the embodiment of FIG. 2 or exit surface 304 of wedge member 26 as in the embodiment of FIG. 3 when the light sources are appropriately positioned in conjunction with correspondingly chosen apex angles for the entry surfaces. The selection of apex angles and light variations obtained are generally discussed in the '993 patent. Although the '993 patent illustrates a toroidal optical system, a reflective optical system can alternatively be used as well. Alternatively, the light can pass through the prisms 12 as in the preferred device of the '993 patent so as to also reflect off the reflective surface or face 18. Here again the light sources are positioned and prism angles are selected in accordance with the focusing optical system to obtain this mode of operation. However, it should be noted that in the case of operation so as to include the reflective face 18, there is much greater bending than in the refraction mode of operation without use of the reflective face 18. Typically, the amount of bending is four times as large for the reflection mode than the refraction mode.

Referring to FIGS. 7 through 9, a prismatic assembly 110 is shown which is known in the prior art. Such assembly is included with 48 sector members 120 in the ALM Model 700 light as referred to above in the technical manual entitled "Operating Theatre Light ECL 701" (1983). As shown in FIGS. 7–9, the individual prisms 112 are positioned integrally on top of a sector member 120 that has a generally flat bottom surface 118 between inner and outer end portions 122 and 124, respectively. The prisms 112 are straight and have an entry face 114, an exit face 116 which coincides with the bottom surface of the sector member 120, and a reflective face 118. As shown in the cupola assembly drawing for the ALM Model 700 Light, the inner end portion 122 is retained within an annular seal or retaining ring. Similarly, the outer end portion 124 is retained within a groove in a joint seal as shown in the cupola assembly drawing. A dust cover can be positioned, if desired, below the lower surface 118 of the support member 120 to provide a further sealing element that aids in maintaining the internal components of the cupola housing in a sterile environment. With 48 sector members 120, each provides a sector angle of 7.5°.

The preferred embodiment of the optical assembly of the ALM Model 700 light as illustrated in the technical manual noted above has two toroidal optical systems. These incorporate two compact light sources with respective spherical reflectors and toroidal lenses which direct the resultant light rays generally at an angle 30 degrees below horizontal. The 48 prism sectors 110 have straight entry faces 114 which are normal (perpendicular) to these light rays in the vertical plane. Since they are straight and not at a radius of curvature corresponding to a radius line from the optical axis, the rays entering the face 114 to either side of the sector center line are refracted laterally which spreads the beam. The angle of the reflective face 118 is chosen to direct the rays longitudinally into overlapping elements at the treatment field. The flat exit surface 118 is optically parallel to the entry surface to complete the lateral light ray refraction. The resultant uniform pattern of light focused onto the treatment field is spread longitudinally and laterally from each sector into about an eight degree beam. About half of this spread is a result of the size of the light source and about half is a result of the length of the flat face 114 which produces lateral spread and the angle of the reflecting face 118 which provides longitudinally overlapping beams. Alternatively, the prism angles can be chosen in accordance with the positioning of the light sources and focusing optics, whether toroidal lens or reflective, so that the light rays enter entry face 114 at a non-perpendicular angle. Thereafter, the light rays can pass through the sector member 120 and out the exit face 116 in a refractive mode without reflecting from the reflecting face 118.

Yet another embodiment of a prismatic assembly 210 according to the present invention is illustrated in FIGS.

10–15. The embodiment illustrated therein is also suitable for the ALM Model 700 light. The width of the sector member 20 has been reduced preferably in half as compared to the size or width of the sector 120 in the embodiment shown in FIG. 7. This structure reduces the lateral spread of the light rays resulting in minimal lateral spread. By changing the angle of the reflective face 218, the longitudinal beam spread could also be reduced resulting in a uniform small and much brighter spot of light. In the embodiment illustrated in FIG. 11, the exit face 218 of sector member 220 is of a generally flat configuration. In this configuration, a complete prism assembly for use in a ALM Model light would include about 96 prism sectors 220 positioned about a central axis. Referring to FIG. 12, an alternative embodiment of the half sector prism assembly 210 of FIG. 10 is shown wherein the exit surface 216' which is the exit face of the prisms 212 has a generally arc shaped configuration of the type described in connection with FIGS. 1–6 to spread light laterally. Yet another embodiment is shown in FIG. 13 wherein the arc shaped configuration of exit surface 230 appears in a separate wedge member 226 which is positioned below the sector member 220. As shown in FIG. 13, the wedge member 226 need not be coupled directly to the lower surface of sector member 220 but can be positioned below so as to provide for passage of light through sector 220 and thereafter through the wedge member 226 and finally out the exit face 230 as in the embodiment of FIG. 3 Alternatively, the wedge member 226 can be coupled to the sector member 220 so that their opposing surfaces are contiguous or mated to one another so as not to interfere optically with the passage of the light rays. Although the prisms 212 in the various embodiments discussed herein have been shown generally to be integrally formed with the sector members of the various embodiments, it should be recognized that the prisms can also be formed separately and thereafter optically coupled to the respective sector members.

Referring to FIG. 16, a lighting device 340 according to the present invention includes two light sources 342 and 344 positioned or disposed one above the other along the optical axis 346. Generally, FIG. 16 illustrates an ALM Model 700 light which includes a tilt or displacing mechanism as described in more detail below. Toroidal focusing lenses 348 and 350 are positioned or disposed adjacent light sources 342 and 344, respectively, as shown in FIG. 16 along the optical axis 346. In general, the structure of the device of FIG. 16 is shown in drawing 9.2C of the aforementioned technical manual entitled "Operating Theatre Light ECL 701." Many of the structural and operational elements of FIG. 16 are commonly shown in drawing 9.2C of that manual and described therein to which reference is made for further detailed discussion. However, as shown in FIG. 16, there are modifications to the structure of the 700 model light of drawing 9.2C which allow for the tilting or displacing capability.

A plurality of prisms 312 with corresponding sector members 320, of the type shown generally in FIGS. 1 or 10 and as previously discussed, are positioned or disposed generally about the optical axis 346 of the device 340. A handle assembly 352 is positioned along the optical axis 346.

Referring to FIG. 18, the handle assembly 352 is illustrated together with the displacement mechanism 354 that allows for the tilting capability of the prism sectors 320. The inner end portion 322 of the prism assembly sector member 320 is supported within the outer channel of an L shaped member 356 of a prism ring or adjustment bracket 358. As also shown in greater detail in FIG. 19, the prism adjustment bracket 358 is formed of an annular ring 360 which has apertures 362 for bushings 364 which slide along spacer rods 366, one of which is shown in FIGS. 16 and 17. Along the periphery of the annular ring 360, the L shaped annular member 356 extends downwardly to provide the channel into which the inner end member 322 of the prism assembly 310 is positioned and supported as shown. Three pins 368, as shown in FIG. 18, are attached by nuts 370 secured to threads at the respective ends of pins 368 to annular ring 360 at three mounting holes 372 to cooperate with a prism adjustment plate 374 which rotates as described below to cause the prism adjustment bracket 358 to move up or down and thus provide the tilt or displacement capability of the prisms 312.

The prism adjustment plate 374 is shown in greater detail in FIGS. 20 and 21. The prism adjustment plate 374 includes three raised surfaces or ramp 376 which are preferably spaced apart on the prism adjustment plate 374 and cooperate with the three correspondingly spaced pins 368 as shown in FIG. 18. If desired, the pins 368 and ramps 376 can be equally spaced apart. The prism adjustment plate 374 has a lever 378 as shown in FIG. 20. Upon rotation of the prism adjustment plate 374 by moving lever 378, the pins 368 will engage the raised surfaces or ramps 376 and, depending upon the relative position in rotation of the plate 374, will vertically dispose or tilt the inner end portion 322 of the prism assembly 310. The rotational movement of the prism adjustment plate 374 is illustrated in FIG. 22 which in solid line illustrates the prism adjustment plate 374 in a position 1 and in phantom shows the same in a later position 2. Correspondingly the prism assembly inner end portion 322 will be advanced upwardly in the direction of the optical axis 346 in movement from position 1 to 2. The prism adjustment plate 374 with tab or lever 378 allows medical personnel to rotate the prism adjustment plate 374 with their thumb while holding handle 352. In this manner, the exit faces 316 of prisms 312 can be varied from a non-planar configuration wherein the inner ends 322 are below the horizontal shown in FIG. 16 corresponding to position 1 to a non-planar configuration wherein the inner ends 322 are above the horizontal corresponding to position 2. In between positions 1 and 2, the exit faces 316 can assume a planar configuration. Altneratively, either of positions 1 and 2 can be selected to correspond to a planar configuration for exit faces 316 and the reminaing position can correspond to a non-planar configuration either-above or below the horizontal of FIG. 16. In alternative embodiments, the prism adjustment bracket 358 can be configured and dimensioned so that only a selective number of sector members 320 are retained within the L-shaped member 356 so that less than all that the sectors 320 can be tilted.

In general, rotation of the prism adjustment plate 374 will selectively move the prism bracket 358 upwardly or downwardly along the spacer rod 366. In this manner, the inner end members 322 of the sectors 320 of prisms 312 can be displaced upwardly or downwardly along the optical axis 346. Preferably, this displacement is up to about 1½ degrees above or below a planar configuration of the exit or aperture faces of the prisms 312. Thus, a total displacement of preferably about 3 degrees is available. If the toroidal optical system 348,350 and prism assembly 310 are configured to operate using only refraction and not refraction plus reflection, then about 12 degrees of total displacement would be required to obtain the same effect as obtained with a three degree displacement with reflection off the relective face 318.

Referring to FIG. 16, an O-ring gasket 380 is provided to seal the dust cover 382 into the existing gasket Of a typical ALM light. Three adjustment screws 384 with springs 386 and securement nuts 388 with accompanying washers shown in FIG. 22 are provided, of which one set is shown in FIG. 18, to adjust the position of the prism adjustment bracket 360 to uniformally engage pins 368. The adjustment screws 384 can slide along oval slots 389 as shown in FIG. 22 as an aid in adjustment. In this fashion, the prism adjustment plate 358 can be selectively levelled by rotation of the screws 384. As more clearly shown in FIG. 17, each spacer rod 366 is modified in size to reduced portion 392 and further reduced portion 394. The reduced portion 392 accomodates a spring 396 and bushing 364 which is positioned above the annular ring 360 within aperture 362. The spring 396 is retained between washer 398 and bushing 364. The spring 396 will normally downwardly bias annular ring 360 in the prism adjustment bracket 358. The further reduced portion 394 accomodates a lower insulating bushing 400 and is threaded at its end to allow securement with threaded nut 402.

The inner end portion 322 of the prism sector members 320 can thus be displaced in either an up or down direction from a planar configuration as originally shown in FIG. 16. Although the preferred embodiment provides for displacement of the inner end portions 322 of the prism sector members 320, alternatively, the inner end members 322 can be kept fixed while the outer end members 324 can be adapted to move in an up or down direction relative to the optical axis 346 so as to provide for the tilt. In addition, if desired, both the inner and outer end members 322 and 324 of the prism assemblies 310 can be displaced so as to provide for a greater range of displacement.

By means of the tilt capability, the operational range of the ALM light can be dynamically increased. Typically, the ALM 700 light is generally focused at about 42 inches from the treatment field. The depth of field for this focused position is about 27 inches, i.e., 13½ inches above and 13½ inches below the 42 inch focused plane. However, with the tilt capability, the ALM 700 light can be focused at various positions within a range from 30 inches through 54 inches. At any position within this range, the light will have a different corresponding depth of field which thereby includes the dynamic optical range of use. In addition, for any given position of focus, the tilt capability allows for variation of the illuminated pattern from a spot of uniform but more intense illumination to a flood of less intense uniform illumination over a larger area in the operating field. In this fashion, the medical personnel can obtain varied illumination patterns without having to reposition the light. The lighting device of the present invention thus provides the capability of relatively smaller and more intense light patterns as desired for particular surgical procedures. Moreover, changes from straight to curved prisms or changes in the length of straight prisms and/or the angle of some of the reflective prism surface 18 will allow for an increase of illumination within a predetermined operating field without a requisite increase in the power of the source which might undesirably increase the heat concentrated at the operating site. In this regard, 60 narrower sectors (i.e., 6° rather than 7.5°) with the existing prism surfaces is a preferred arrangement for increased illumination of up to 100,000 lux with an ALM 700 light which presently provides about 80,000 lux as noted in the aforementioned technical manual. In addition, depending on the source as well as the sizing of the source, different patterns or intensity variations are available as desired.

While the present invention has been described and illustrated herein with respect to a preferred embodiment thereof, it should be apparent that various modifications, adaptions and variations may be made utilizing the teachings of the present disclosure without departing from the scope of the invention and are intended to be within the scope of the present invention.

I claim:

1. A device for lighting a treatment field comprising:
   a. means for focusing a plurality of light rays;
   b. prism assembly formed of a plurality of sector members, wherein each of said sector member has a plurality of prisms, each prism having an entry face and an exit face, the vertices of the sector members being substantially located at the center of the prism assembly, the sector members having prisms being configured and dimensioned so that the focusing means can focus the plurality of light rays generally onto the entry faces of the prisms; and
   c. means for displacing at least a predetermined number of sector members such that the exit faces of the prisms of the predetermined sector can be selectively disposed in a configuration being one of a generally planar and a non-planar configuration.

2. The lighting device of claim 1 wherein the means for focusing a plurality of light rays comprises at least one generally reflected optical system.

3. A device for lighting a treatment field comprising:
   a. means for focusing a plurality of light rays;
   b. prism assembly formed of a plurality of sectors of prisms, each prism having an entry face and an exit face, the vertices of the sectors being substantially located in the center of the prism assembly, the sectors of prism being configured and dimensioned so that the focusing means can focus the plurally of light rays generally onto the entry faces of the prisms; and
   c. means for displacing at least a predetermined number of sectors such that the exit faces of the prisms of the predetermined sector can be selectively disposed in a configuration being one of a generally planar and a non-planar configuration, wherein the displacing means comprises an annular member configured and dimensioned so as to support the inner ends of the predetermined sectors and being selectively moveable along a predetermined direction such that movement of the annular member disposes the predetermined prism exit faces in a configuration being one of a generally planar and a non-planar configuration.

4. The lighting device of claim 3 wherein the annular member is selectively movable from a first position to a second position such that the prism assembly will focus light at a range of planes respectively between a first plane and a second plane.

5. The lighting device of claim 4 wherein a relatively small intense light spot is produced at one plane while a relatively large reduced intensity area of light is produced at other planes at least above and below the plane of the small light spot.

6. The lighting device of claim 4 wherein the displacement from the first position to the second position preferably provides an angular deviation of the beam of light rays exiting from the exit faces of the prisms of about six degrees.

7. The lighting device of claim 3 wherein the annular member is selectively movable along the predetermined direction from a first position whereby the prism exit faces are generally non-planar through an intermediate position whereby the prism exit faces are generally planar and to a second position whereby the prism exit faces are generally non-planar.

8. The lighting device of claim 7 wherein the first position to the second position preferably provides an angular deviation of the beam of light rays exiting from the exit faces of the prisms from about minus three degrees to plus three degrees as determined from the intermediate position whereby the prism exit faces are generally planar.

9. The lighting device of claim 3 wherein the annular member has an L shaped member disposed along its periphery and extending outwardly therefrom so as to receive the inner ends of the predetermined sectors.

10. The lighting device of claim 9 wherein the displacing means comprises at least one rod member disposed generally along the predetermined direction.

11. The lighting device of claims 10 wherein the annular member is configured and dimensioned so as to be selectively slidably moveable along at least a portion of the at least one rod member.

12. The lighting device of claim 11 wherein the displacing means further comprises:

a. plate member having at least one raised surface of a predetermined slope, the plate member being rotatably disposed adjacent the annular member; and b. at least one pin member coupled at one end to the annular member and at its other end being in contact with the raised surface such that upon rotation of the plate member, the pin member at its other end will move along the raised surface and corresponding displace the annular member together with the inner ends of the prisms along the rod member.

13. The lighting device of claim 12 further comprising a plurality of pin members coupled at their one ends to the annular member, and the plate member having a corresponding plurality of raised surfaces so that each other end of the pin members is in contact with a respective raised surface on the plate member.

14. The lighting device of claim 13 wherein the plurality of pin members are spaced relative to the annular member and the raised surfaces are correspondingly spaced about the plate member.

15. The lighting device of claim 14 further comprising a tab extending from a portion of the periphery of the plate member whereupon selective movement of the tab will rotate the plate member and thereby displace the inner ends of the prisms along the rod member.

16. A device for lighting a treatment field comprising:

a. means for focusing a plurality of light rays;

b. prism assembly formed of a plurality of sectors of prisms, each prism having an entry face and an exit face, the vertices of the sectors being substantially located in the center of the prism assembly, the sectors of prisms being configured and dimensioned so that the focusing means can focus the plurality of light rays generally onto the entry faces of the prism: and c. means for displacing a least a predetermined number of sectors such that the exit faces of the prisms of the predetermined sectors can be selectively disposed in a configuration being one of a generally planar and a non-planar configuration, wherein the means for focusing a plurality of light rays comprises at least one generally toroidal optical system.

17. The lighting device of claim 16 wherein the toroidal optical system has an optical axis which generally intersects the center of the prism assembly.

18. The lighting device of claim 17 further comprising at least one light source dimensioned and configured so that at least a portion of light rays emitted from the light source fall onto the toroidal optical system and are focused onto the entry faces of the prisms.

19. The lighting device of claim 17 further comprising at least one light source dimensioned and configured so that at least a portion of light rays emitted from the light source are collected by the reflective optical system and are focused onto the entry faces of the prisms.

20. The lighting device of claim 16 wherein the reflective optical system has an optical axis which generally intersects the center of the prism assembly.

21. A device for lighting a treatment field comprising:

a. means for focusing a plurality of light rays;

b. prism assembly formed of a plurality of sectors of prisms, each prism having an entry face and an exit face, the vertices of the sectors being substantially located in the center of the prism assembly, the sectors of prisms being configured and dimensioned so that the focusing means can focus the plurality of light rays generally onto the entry faces of the prisms; and c. means for displacing at least a predetermined number of sectors such that the exit faces of the prisms of the predetermined sectors can be selectively disposed in a configuration being one of a generally planar and a non-planar configuration, wherein each prism has a reflective face for receiving light directed thereto after passing through the entry face and for directing light through the exit face of the prism.

22. An optical apparatus for a device for lighting a treatment field comprising:

a. prism assembly formed of a plurality of sector members, wherein each of said sector members has a plurality of prisms, each prism having an entry face and an exit face, the vertices of the sector members being substantially located at the center of the prism assembly, the sector members having prisms being configured and dimensioned so that a plurality of light rays falling generally onto the entry faces of the prisms is directed onto the treatment field; and b. means for displacing at least a predetermined number of sector members such that the exit faces of the prisms of the predetermined sector members can be selectively positioned in a configuration being one of a generally planar and a non-planar configuration.

23. The apparatus of claim 22 further comprising means for focusing a plurality of light rays so as to fall generally onto the entry faces of the prism.

24. The apparatus of claim 23 wherein the means for focusing a plurality of light rays comprises at least one generally reflective optical system.

25. An optical apparatus for a device for lighting a treatment field comprising:

a. prism assembly formed of a plurality of sectors of prisms, each prism having an entry face and an exit face, the vertices of the sectors being substantially located in the center of the prism assembly, the sectors of prisms being configured and dimensioned so that a plurality of light rays falling generally onto the entry faces of the prisms is directed onto the treatment field; an b. means for displacing at least a predetermined number of sectors such that the exit faces of the prisms of the predetermined sectors can be selectively positioned in a configuration being one of a generally planar an a non-planar configuration, wherein each prism has a reflective face for receiving light directed thereto after passing through the entry face and for directing light through the exit face of the prism.

26. An optical apparatus for a device for lighting a treatment field comprising:
   a. prism assembly formed of a plurality of sectors of prisms, each prism having an entry face and an exit face, the vertices of the sectors being substantially located in the center of the prism assembly, the sectors of prisms being configured an dimensioned so that a plurality of light rays falling generally onto the entry faces of the prisms is directed onto the treatment field:
   b. means for displacing at least a predetermined number of sectors such that the exit faces of the prisms of the predetermined sectors can be selectively positioned in a configuration being one of a generally planar and a non-planar configuration; and
   c. means for focusing plurality of light rays so as to fall generally onto the entry faces of the prisms, wherein the means for focusing a plurality of light rays comprises at least one generally toroidal optical system, 27. An optical apparatus for a device for lighting a treatment field comprising
   a. prism assembly formed of a plurality of sectors of curved prisms, each prism having an entry face and an exit face, the vertices of the sectors being substantially located in the center of the prism assembly, the sectors of curved prisms being configured and dimensioned so that a plurality of light rays falling generally onto the entry faces of the prisms is directed onto the treatment field;
   b. the exit faces of the curved prisms being generally arc shaped along the length of the sector; and
   c. means for displacing at least a predetermined number of sectors such that the exit faces of the prisms of the predetermined sectors can be selectively disposed in a configuration being one of a generally planar and a non-planar configuration.

28. An optical apparatus for a device for lighting a treatment field comprising:
   a. prism assembly formed of a plurality of sectors of straight prisms, each prism having an entry face and an exit face, the vertices of the sectors being substantially located in the center of the prism assembly, the sectors of straight prisms being configured and dimensioned so that a plurality of light rays falling generally onto the entry faces of the prism is directed onto the treatment field;
   b. the exit faces of the straight prisms being generally arc shaped along the length of the sector; and
   c. means for displacing at least a predetermined number of sectors such that the exit faces of the prisms of the predetermined sectors can be selectively disposed in a configuration being one of a generally planar and a non-planar configuration.

29. Method for lighting a treatment field comprising:
   a. positioning a lighting device adjacent and at a desired height above the treatment field, the lighting device comprising:
      1. light source;
      2. means for focusing a plurality of light rays from the light source;
      3. prism assembly formed of a plurality of sectors of prisms, each prism having an entry face and an exit face, the vertices of the sectors being substantially located in the center of the prism assembly, the sectors of prisms being configured and dimensioned so that the focusing means can focus the plurality of light rays generally onto the entry faces of the prisms; and
      4. means for displacing at least a predetermined number of sectors such that the exit faces of the prisms of the predetermined sectors can be selectively disposed in a configuration being one of a generally planar and a non-planar configuration;
   b. turning on the light source; and
   c. selectively operating the displacing means so as to selectively dispose the exit faces of the prisms in one of a generally planar and a non-planar configuration so as to produce a predetermined light spot size at a desired plane with a corresponding relatively reduced intensity area of light at planes at least above and below the plane of the small light spot.

* * * * *